US012659550B2

(12) United States Patent
Ajgaonkar

(10) Patent No.: US 12,659,550 B2
(45) Date of Patent: Jun. 16, 2026

(54) SCHEDULED SCENE MODIFICATION FOR EXTRACTION, PREPROCESSING, AND PUBLISHING OF STREAMING VIDEO DATA

(71) Applicant: Insight Direct USA, Inc., Tempe, AZ (US)

(72) Inventor: Amol Ajgaonkar, Chandler, AZ (US)

(73) Assignee: Insight Direct USA, Inc., Chandler, AZ (US)

( * ) Notice: Subject to any disclaimer, the term of this patent is extended or adjusted under 35 U.S.C. 154(b) by 513 days.

(21) Appl. No.: 17/873,760

(22) Filed: Jul. 26, 2022

(65) Prior Publication Data

US 2024/0040115 A1 Feb. 1, 2024

(51) Int. Cl.
*H04N 21/4728* (2011.01)
*H04N 19/172* (2014.01)
*H04N 21/2343* (2011.01)
*H04N 21/43* (2011.01)

(52) U.S. Cl.
CPC ....... *H04N 21/4728* (2013.01); *H04N 19/172* (2014.11); *H04N 21/2343* (2013.01); *H04N 21/43* (2013.01)

(58) Field of Classification Search
CPC ............. H04N 21/4728; H04N 19/172; H04N 21/2343; H04N 21/43
See application file for complete search history.

(56) References Cited

U.S. PATENT DOCUMENTS

| 5,857,109 | A | 1/1999 | Taylor |
| 6,757,434 | B2 | 6/2004 | Miled et al. |

| 7,334,249 | B1 | 2/2008 | Byers |
| 7,636,097 | B1 * | 12/2009 | Holloway ................ G09G 5/00 |
| | | | 345/611 |
| 8,031,956 | B2 | 10/2011 | Ali |
| 8,229,587 | B2 | 7/2012 | Shieh et al. |
| 8,358,319 | B2 | 1/2013 | Côtéet al. |
| 8,493,482 | B2 | 7/2013 | Côtéet al. |

(Continued)

FOREIGN PATENT DOCUMENTS

| AU | 499889 | B2 | 5/1979 |
| AU | 2001296636 | A1 | 4/2002 |

(Continued)

*Primary Examiner* — James R Sheleheda

(74) *Attorney, Agent, or Firm* — Kinney & Lange, P.A.

(57) ABSTRACT

A method of scheduled modifications of preprocessing of incoming video data of at least one region of interest from a camera collecting video data having a first field of view includes receiving incoming video data from the camera and preprocessing the incoming video data, by a computer processor, according to preprocessing parameters defined within a runtime configuration file. The preprocessing includes formatting the incoming video data to create first video data of a first region of interest with a second field of view that is less than the first field of view. The method also include publishing the first video data of the first region of interest to an endpoint to allow access and processing by a subscriber; in response to a time schedule, altering the preprocessing parameters defined within the runtime configuration file dependent upon the time schedule to create second video data that is different from the first video data; and publishing the second video data to the endpoint to allow access and processing by the first subscriber.

15 Claims, 6 Drawing Sheets

(56) References Cited

U.S. PATENT DOCUMENTS

| | | | |
|---|---|---|---|
| 8,539,355 B2 | 9/2013 | Compagnat et al. | |
| 8,577,279 B2 | 11/2013 | Baker et al. | |
| 8,593,483 B2 | 11/2013 | Côté et al. | |
| 8,786,625 B2 | 7/2014 | Côté et al. | |
| 9,100,588 B1 | 8/2015 | Seymour | |
| 9,741,098 B2 | 8/2017 | Cox | |
| 9,871,998 B1 | 1/2018 | Curlander et al. | |
| 10,057,636 B1 | 8/2018 | Nijim et al. | |
| 10,114,980 B2 | 10/2018 | Barinov et al. | |
| 10,122,906 B2* | 11/2018 | Yang | H04N 7/188 |
| 10,176,309 B2 | 1/2019 | Tormasov et al. | |
| 10,380,431 B2 | 8/2019 | Winter et al. | |
| 10,424,087 B2 | 9/2019 | Risser | |
| 10,497,136 B2 | 12/2019 | Tamaazousti et al. | |
| 10,529,106 B2 | 1/2020 | Eckert | |
| 10,636,173 B1* | 4/2020 | Beach | G06V 10/82 |
| 10,674,185 B2 | 6/2020 | Thomas et al. | |
| 10,687,022 B2 | 6/2020 | Rasheed et al. | |
| 10,701,321 B2 | 6/2020 | Westmacott et al. | |
| 10,756,912 B2 | 8/2020 | Balasaygun et al. | |
| 10,776,941 B2 | 9/2020 | Hollander et al. | |
| 10,860,860 B1 | 12/2020 | Huynh et al. | |
| 10,922,105 B1 | 2/2021 | Verma et al. | |
| 10,958,854 B2 | 3/2021 | Elboher | |
| 10,972,519 B2 | 4/2021 | Bar-Mashiah et al. | |
| 10,979,663 B2 | 4/2021 | Amengual Galdon et al. | |
| 10,979,718 B2 | 4/2021 | Chou et al. | |
| 11,038,884 B2 | 6/2021 | Li | |
| 11,044,525 B2 | 6/2021 | Armaly | |
| 11,050,551 B2 | 6/2021 | Maggu et al. | |
| 11,075,744 B2 | 7/2021 | Tormasov et al. | |
| 11,115,627 B1* | 9/2021 | Drako | G08B 25/006 |
| 11,120,013 B2 | 9/2021 | Bates et al. | |
| 11,138,345 B2 | 10/2021 | Zou et al. | |
| 11,153,069 B2 | 10/2021 | Kurian | |
| 11,196,978 B2 | 12/2021 | Presler | |
| 11,594,032 B1 | 2/2023 | Raman | |
| 11,704,891 B1* | 7/2023 | Ajgaonkar | G06V 10/25 |
| | | | 382/103 |
| 11,778,167 B1* | 10/2023 | Ajgaonkar | H04N 23/90 |
| | | | 348/180 |
| 11,849,240 B2* | 12/2023 | Ajgaonkar | G06V 20/40 |
| 11,849,241 B2* | 12/2023 | Ajgaonkar | H04N 21/44008 |
| 11,849,242 B2* | 12/2023 | Ajgaonkar | G11B 27/031 |
| 11,961,273 B2* | 4/2024 | Ajgaonkar | G06V 10/36 |
| 12,106,536 B2* | 10/2024 | Ajgaonkar | G06T 5/00 |
| 12,108,024 B2* | 10/2024 | Ajgaonkar | H04N 23/90 |
| 12,118,916 B2 | 10/2024 | Yang et al. | |
| 12,148,192 B2* | 11/2024 | Ajgaonkar | G06V 10/20 |
| 2001/0053275 A1* | 12/2001 | Adachi | H04N 5/262 |
| | | | 386/290 |
| 2006/0225120 A1* | 10/2006 | Lee | H04N 21/4363 |
| | | | 725/100 |
| 2006/0277256 A1 | 12/2006 | Tiruthani et al. | |
| 2006/0279628 A1* | 12/2006 | Fleming | G11B 27/34 |
| | | | 348/E7.086 |
| 2006/0287081 A1* | 12/2006 | Osawa | G07F 17/323 |
| | | | 463/16 |
| 2007/0013801 A1 | 1/2007 | Sezan et al. | |
| 2007/0047834 A1* | 3/2007 | Connell | G06T 5/70 |
| | | | 382/274 |
| 2007/0189708 A1 | 8/2007 | Lerman et al. | |
| 2009/0033745 A1 | 2/2009 | Yeredor et al. | |
| 2009/0317056 A1* | 12/2009 | Hu | G08B 13/1968 |
| | | | 386/292 |
| 2010/0104027 A1 | 4/2010 | Youn et al. | |
| 2010/0131554 A1 | 5/2010 | Cooper | |
| 2010/0198947 A1* | 8/2010 | Daughtery | G06F 9/541 |
| | | | 717/171 |
| 2011/0041080 A1* | 2/2011 | Fleischman | G06F 16/24573 |
| | | | 715/751 |
| 2012/0044945 A1 | 2/2012 | Bhayani | |
| 2012/0075435 A1* | 3/2012 | Hovanky | H04N 13/257 |
| | | | 348/51 |
| 2012/0154666 A1* | 6/2012 | Ohashi | H04N 23/673 |
| | | | 348/E5.045 |
| 2013/0038737 A1 | 2/2013 | Yehezkel et al. | |
| 2013/0216207 A1* | 8/2013 | Berry | H04N 5/91 |
| | | | 386/282 |
| 2014/0078300 A1* | 3/2014 | Tine | G08B 13/196 |
| | | | 348/E5.042 |
| 2014/0362231 A1* | 12/2014 | Bietsch | G06T 7/20 |
| | | | 348/169 |
| 2015/0026718 A1 | 1/2015 | Seyller | |
| 2016/0127749 A1 | 5/2016 | Chowdhury et al. | |
| 2016/0205341 A1 | 7/2016 | Hollander et al. | |
| 2017/0085892 A1 | 3/2017 | Liu et al. | |
| 2017/0134162 A1 | 5/2017 | Code et al. | |
| 2017/0308403 A1* | 10/2017 | Turull | G06F 9/4555 |
| 2018/0167698 A1 | 6/2018 | Mercer et al. | |
| 2018/0268864 A1 | 9/2018 | Bovik et al. | |
| 2018/0330169 A1* | 11/2018 | van Hoof | G06V 20/46 |
| 2018/0342045 A1 | 11/2018 | Lutz et al. | |
| 2019/0030713 A1* | 1/2019 | Gabardos | B25J 9/163 |
| 2019/0045207 A1* | 2/2019 | Chen | G06F 21/44 |
| 2020/0007958 A1 | 1/2020 | Wondra et al. | |
| 2020/0090701 A1* | 3/2020 | Xu | H04N 21/2743 |
| 2020/0195693 A1 | 6/2020 | Price et al. | |
| 2020/0336710 A1 | 10/2020 | Zhang | |
| 2020/0349361 A1* | 11/2020 | Oh | G05D 1/0088 |
| 2020/0364468 A1* | 11/2020 | Sulzer | G06F 18/217 |
| 2020/0380261 A1 | 12/2020 | Chandran et al. | |
| 2021/0124760 A1 | 4/2021 | Klein et al. | |
| 2021/0165966 A1 | 6/2021 | Swamypillai et al. | |
| 2021/0195268 A1 | 6/2021 | Jiang et al. | |
| 2021/0227126 A1 | 7/2021 | Se et al. | |
| 2021/0233204 A1 | 7/2021 | Alattar et al. | |
| 2021/0314396 A1 | 10/2021 | Basu et al. | |
| 2021/0321064 A1 | 10/2021 | Broaddus | |
| 2021/0337217 A1 | 10/2021 | Reddiar et al. | |
| 2021/0343126 A1* | 11/2021 | Drako | G08B 13/19686 |
| 2022/0044334 A1 | 2/2022 | Blaikie et al. | |
| 2022/0083797 A1 | 3/2022 | Kim | |
| 2022/0122360 A1* | 4/2022 | Singh | G06T 7/75 |
| 2022/0179703 A1 | 6/2022 | Vincent et al. | |
| 2022/0276940 A1 | 9/2022 | Wald | |
| 2022/0329539 A1 | 10/2022 | Kim et al. | |
| 2022/0368972 A1* | 11/2022 | Cheraghi | H04N 21/4622 |
| 2023/0022294 A1* | 1/2023 | Huang | G06F 9/4881 |
| 2023/0056885 A1 | 2/2023 | Mamadapur et al. | |
| 2023/0206583 A1* | 6/2023 | Ajgaonkar | G06T 5/00 |
| | | | 382/103 |
| 2023/0206634 A1* | 6/2023 | Ajgaonkar | G06N 20/00 |
| | | | 382/100 |
| 2023/0209004 A1* | 6/2023 | Ajgaonkar | G11B 27/031 |
| | | | 386/278 |
| 2023/0209005 A1* | 6/2023 | Ajgaonkar | G06V 30/10 |
| | | | 386/278 |
| 2023/0316696 A1* | 10/2023 | Ajgaonkar | G06T 5/00 |
| | | | 382/103 |
| 2024/0037892 A1* | 2/2024 | Ajgaonkar | H04N 23/80 |
| 2024/0037893 A1* | 2/2024 | Ajgaonkar | G06V 10/36 |
| 2024/0037915 A1* | 2/2024 | Ajgaonkar | G06N 3/045 |
| 2024/0040108 A1* | 2/2024 | Ajgaonkar | H04N 23/90 |
| 2024/0040115 A1* | 2/2024 | Ajgaonkar | H04N 21/43 |
| 2024/0119702 A1* | 4/2024 | Ajgaonkar | G06V 20/52 |
| 2024/0119724 A1* | 4/2024 | Ajgaonkar | G06Q 30/0623 |
| 2024/0177443 A1* | 5/2024 | Ajgaonkar | G06V 10/20 |
| 2024/0340405 A1* | 10/2024 | Ajgaonkar | H04N 17/00 |

FOREIGN PATENT DOCUMENTS

| | | | |
|---|---|---|---|
| CA | 2260932 A1 | 2/1998 | |
| CA | 3057924 A1 | 4/2021 | |
| CN | 105430429 B | 9/2019 | |
| DE | 2945615 A1 | 5/1981 | |
| EP | 0824824 A1 | 2/1998 | |
| EP | 2200000 B1 | 1/2011 | |
| EP | 3374926 A1 | 9/2018 | |
| EP | 3275175 A4 | 11/2018 | |
| EP | 3559868 A1 | 10/2019 | |
| EP | 3719687 A1 | 10/2020 | |

(56)            References Cited

FOREIGN PATENT DOCUMENTS

| EP | 3644277 A4 | 3/2021 |
| GB | 201406814 | 5/2014 |
| WO | 2001011862 A9 | 2/2001 |
| WO | 2004061729 A2 | 7/2004 |
| WO | 2016078490 A1 | 5/2016 |
| WO | 2020022956 A1 | 1/2020 |
| WO | 2021053604 A1 | 3/2021 |
| WO | 2021135641 A1 | 7/2021 |
| WO | 2021208952 A1 | 10/2021 |
| WO | 2021226601 A1 | 11/2021 |

* cited by examiner

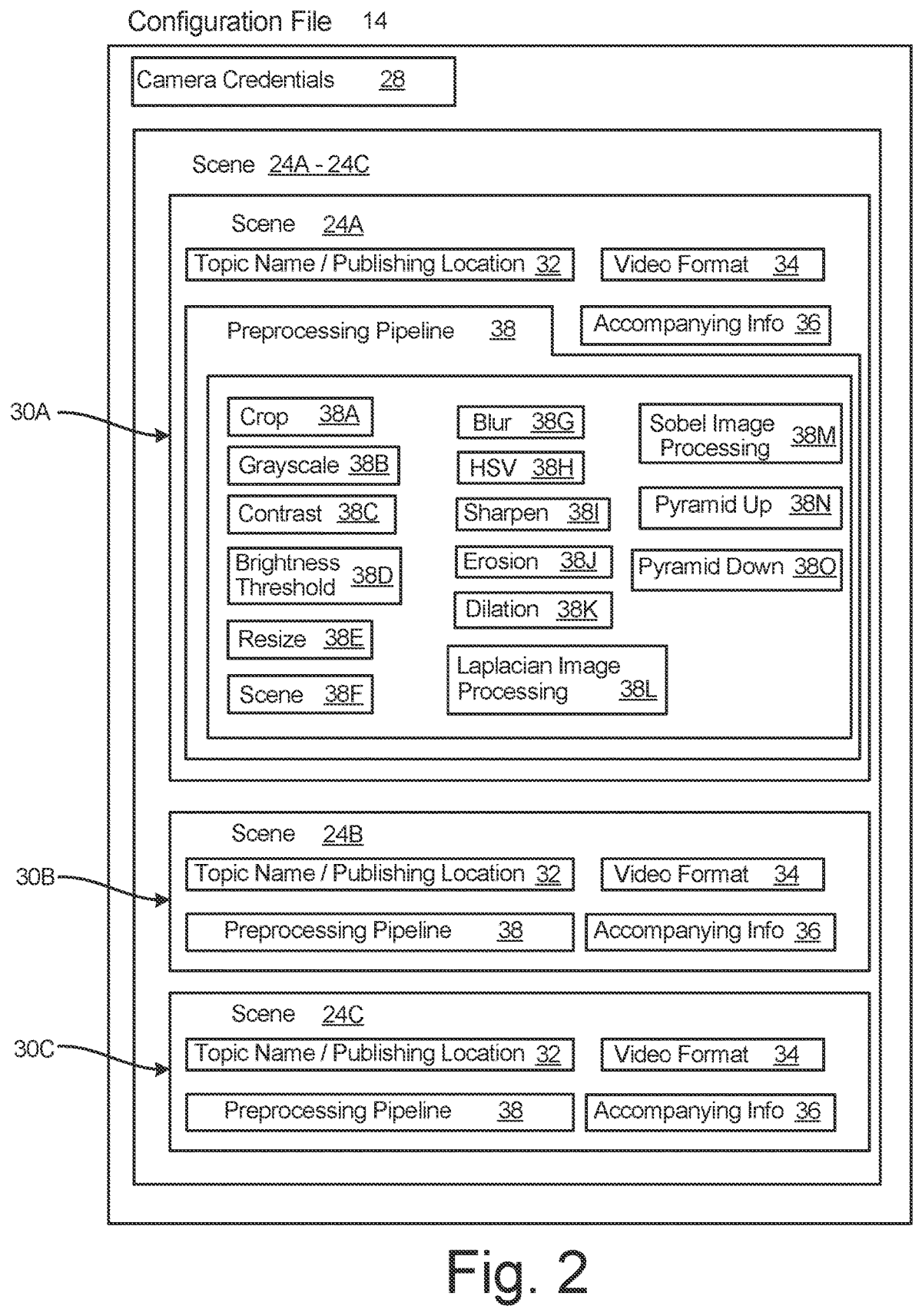

Configuration File    14

Camera Credentials    28

Scene  24A - 24C

Scene   24A

Topic Name / Publishing Location  32      Video Format    34

Preprocessing Pipeline    38          Accompanying Info  36

30A

Crop    38A          Blur   38G          Sobel Image
                                         Processing   38M Grayscale  38B        HSV   38H Contrast   38C        Sharpen   38I       Pyramid Up   38N Brightness    38D     Erosion   38J       Pyramid Down   38O
Threshold Dilation   38K
Resize   38E Laplacian Image
Scene   38F           Processing    38L Scene   24B

30B

Topic Name / Publishing Location  32      Video Format    34

Preprocessing Pipeline    38         Accompanying Info  36

Scene   24C

30C

Topic Name / Publishing Location  32      Video Format    34

Preprocessing Pipeline    38         Accompanying Info  36

Fig. 2

SCHEDULED SCENE MODIFICATION FOR EXTRACTION, PREPROCESSING, AND PUBLISHING OF STREAMING VIDEO DATA

BACKGROUND

This disclosure relates generally to scheduled modification of extraction and preprocessing of streaming video data and, more specifically, to modifying the preprocessing of streaming video data dependent upon at least one of various factors, including the time of day.

Cameras are beneficial for use in many areas of commercial and personal practice. For example, security cameras are used within (and outside) commercial warehouses and on private personal property. Other applications use cameras along assembly lines for quality control purposes. With the increased capabilities of cameras having higher quality imagery (i.e., resolution) and a wider field of view, more area can be shown in the streaming video by the camera. A large portion of the frame/field of view may be of little or no interest to the consumer (e.g., a security or manufacturing company). However, current practices relay the entirety of the streaming video (i.e., the entire frame/field of view) to the consumer, which can be time and resource consuming due to the need to transfer large frame (i.e., field of view), high resolution video data.

SUMMARY

A system and method for selection/extraction, preprocessing, and publishing of video data of a region of interest (i.e., a scene) that is a subset of a field of view of streaming video is disclosed herein. The system and method can also include processing the video data by a consumer/subscriber after the video data has been published.

Streaming video data is received from a camera with a first field of view. The video data is then preprocessed, by a computer processor such as a gateway or digital container, according to preprocessing parameters defined within a runtime configuration file that is pushed down to the computer processor. The runtime configuration file can be stored and/or edited distant from the computer processor, and any edits/revisions to the runtime configuration file can be pushed to and applied by the computer processor to the streaming video data in real time to alter the preprocessing applied to the video data. The preprocessing can include formatting/cropping the streaming video data received from the camera so as to be first video data of a first region of interest (i.e., a scene) having a second field of view that is less than (shows less area than) the first field of view shown by the entirety of the streaming video data from the camera. The preprocessing as defined by the preprocessing parameters in the runtime configuration file can also include altering the first video data's grayscale, contrast, brightness, color threshold, size, blur, hue saturation value (HSV), sharpen, erosion, dilation, Laplacian image processing, Sobel image processing, pyramid up, and pyramid down (among others). The first video data can then be published to an endpoint (such as a topic on an asynchronous messaging library like ZeroMQ) for subscription and use by a first subscriber/consumer.

The first video data can then be viewed, used, and/or processed by the first subscriber. The preprocessing as defined in the runtime configuration file can be tailored to the subscriber and the needs/uses of the subscriber and the processing to be performed by the subscriber. For example, the processing performed by the subscriber after publishing of the first video data may be using an artificial intelligence (AI) model to analyze scenarios occurring on/in the first video data. The AI model may require the first video data to be in a particular size, format, etc., which can be selected and applied during the preprocessing as set out in the runtime configuration file so that the subscriber does not need to perform this preprocessing before applying the AI model. The processing, by a computer processor, of the first video data by the subscriber can be performed distant from the camera, the location at which the runtime configuration file is stored and/or edited, and the gateway/container upon which the preprocessing is performed. The first subscriber can perform the processing of the video data to determine at least one output, with the output being indicative of an inference dependent on the first video data. For example, the first video data can be processed by an AI model to determine the amount of a particular product that has passed by on an assembly line (i.e., the amount of the product being an inference dependent on the first video data). The processing can include other operations, such as applying optical character recognition, clipping the first video data to make a video having a specific duration, and/or capturing one frame from the first video data to create a static image of a specific moment of the first video data.

The preprocessing parameters in the runtime configuration file can be modified dependent upon a time schedule, or the system can include multiple runtime configuration files that are switched out at specific times depending on the time schedule. For example, the gateway can preprocess the streaming video data according to first preprocessing parameters defined within a first runtime configuration file. Depending on the time schedule, the gateway can then switch the preprocessing by preprocessing the streaming video data according to second preprocessing parameters defined within a second runtime configuration file. The preprocessing parameters used as defined within a particular runtime configuration file are dependent upon the time schedule, which can instruct the change in which runtime configuration file is accessed and used by the gateway based on the time of day. For example, the gateway can access and use the first runtime configuration file (so as to preprocess the streaming video data according to the first preprocessing parameters) from 12 AM to 6:59 AM each day and then access and use the second runtime configuration file (so as to preprocess the streaming video data according to the second preprocessing parameters) from 7 AM to 11:59 PM each day. Changing the preprocessing parameters based on the time of day is important because the streaming video data that needs to be preprocessed changes throughout the day, so the preprocessing may need to change to alter the streaming video data to create first video data that is better suited for downstream processing. For example, the streaming video data (as collected by a camera) during the daytime hours may be too bright for suitable use in the downstream processing, so the preprocessing parameters could include additional brightness and/or contrast edits to town down the brightness of the video data. Once sun has moved to decrease the brightness of the streaming video data, the preprocessing parameters could be modified to remove the additional brightness and/or contrast edits as those edits are no longer necessary to put the video data in suitable form for use in downstream processing. The change in preprocessing parameters can include switching the camera source so that the streaming video data coming into the gateway is from a different camera. The ability to switch the camera source may be desirable if, for example, light is shining directly on a first camera, rendering the first streaming video data from the first camera unusable for the intended purpose. The camera source could be switched to a second camera that is oriented so that the light is not greatly affecting the second streaming video data. The scheduled scene modification and preprocessing methods and systems can include other capabilities not expressly disclosed herein, and other benefits will be understood by reviewing this disclosure.

One embodiment of a method of scheduled modifications of preprocessing of incoming video data of at least one region of interest from a camera collecting video data having a first field of view includes receiving incoming video data from the camera and preprocessing the incoming video data, by a computer processor, according to preprocessing parameters defined within a runtime configuration file. The preprocessing includes formatting the incoming video data to create first video data of a first region of interest with a second field of view that is less than the first field of view. The method also include publishing the first video data of the first region of interest to an endpoint to allow access and processing by a subscriber; in response to a time schedule, altering the preprocessing parameters defined within the runtime configuration file dependent upon the time schedule to create second video data that is different from the first video data; and publishing the second video data to the endpoint to allow access and processing by the first subscriber.

Another embodiment includes a method of scheduled modification of a source of incoming video data includes receiving first incoming video data from a first camera and preprocessing the first incoming video data, by a computer processor, according to first preprocessing parameters defined within a first runtime configuration file. The preprocessing includes formatting the first incoming video data to create first video data of a first region of interest. The method also includes publishing the first video data of the first region of interest to an endpoint to allow access by a subscriber; in response to a time schedule, changing the source of incoming video data from the first incoming video data to second incoming video data that is received from a second camera; preprocessing the second incoming video data according to second preprocessing parameters defined within a second runtime configuration file to create second video data that is different from the first video data; and publishing the second video data to the endpoint to allow access and processing by the subscriber.

Another embodiment includes a system for scheduled modification of preprocessing of incoming video data for use by a subscriber that includes a first camera configured to collect first incoming video data that has a frame with a first field of view; a first runtime configuration file that includes first preprocessing parameters for formatting the first incoming video data; a gateway that includes a computer processor, the gateway being configured to receive the first incoming video data from the first camera and preprocess the first incoming video data according to the first preprocessing parameters defined within the first runtime configuration file, wherein the preprocessing of the first incoming video data by the gateway creates first video data of a first region of interest; an endpoint to which the first video data of the first region of interest is published to allow access and processing by the subscriber; and a second runtime configuration file that includes second preprocessing parameters for formatting the first incoming video data. In response to a time schedule, the gateway ceases preprocessing the first incoming video data according to the first preprocessing parameters defined in the first runtime configuration file and begins preprocesses the first incoming video according to the second preprocessing parameters defined in the second runtime configuration file to create second video data. The second video data is published to the endpoint to allow access and processing by the subscriber.

BRIEF DESCRIPTION OF THE DRAWINGS

FIG. 2 is a schematic of the runtime configuration file.

Figure 1:
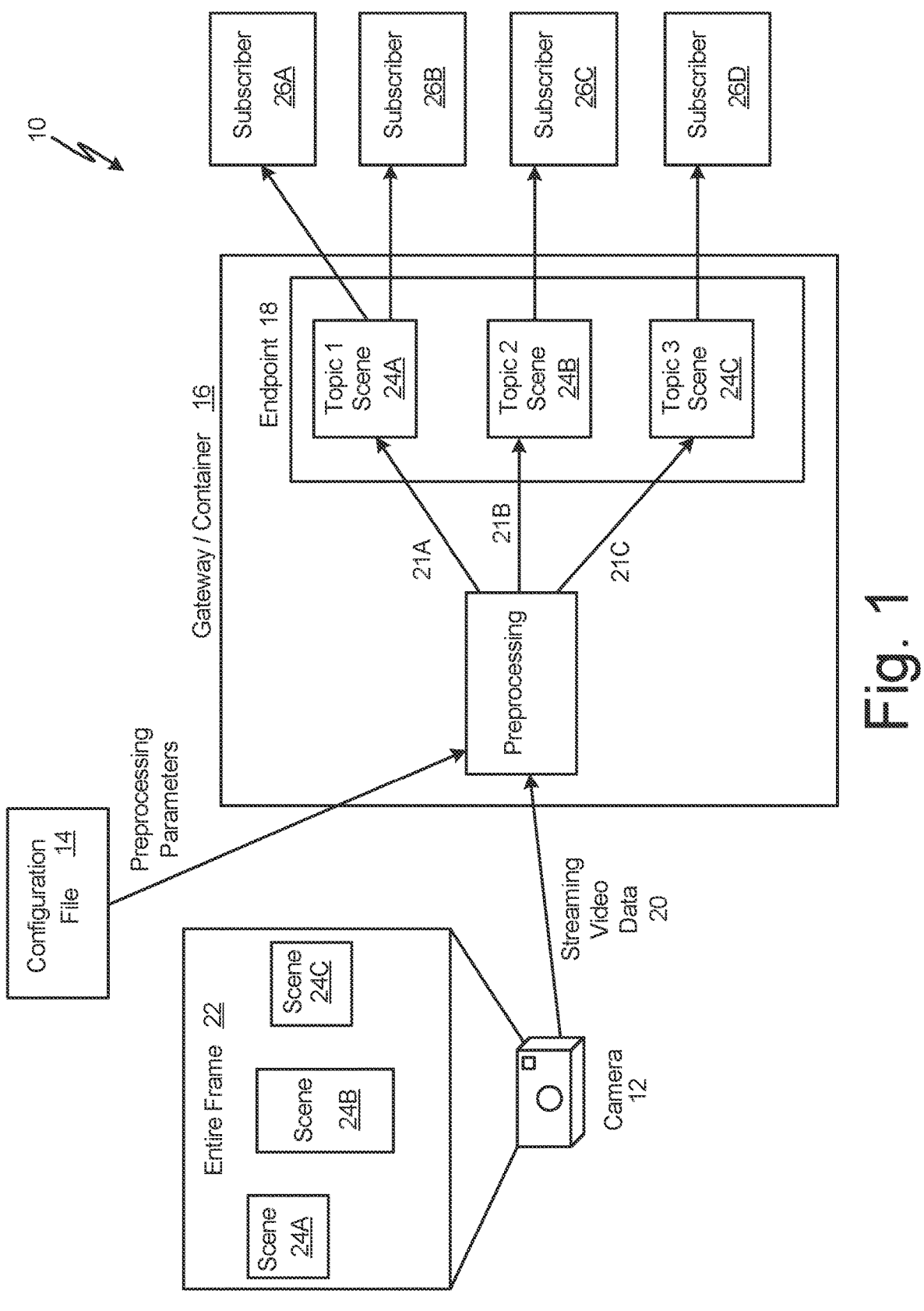
FIG. 1 is a schematic of the scene selection and preprocessing system.

While the above-identified figures set forth one or more embodiments of the present disclosure, other embodiments are also contemplated, as noted in the discussion. In all cases, this disclosure presents the invention by way of representation and not limitation. It should be understood that numerous other modifications and embodiments can be devised by those skilled in the art, which fall within the scope and spirit of the principles of the invention. The figures may not be drawn to scale, and applications and embodiments of the present invention may include features and components not specifically shown in the drawings.

DETAILED DESCRIPTION

FIG. 1 is a schematic of system 10 for selection/extraction, preprocessing, and publishing to subscribers of video data of a region of interest (i.e., a scene) that is a subset of a first field of view of the streaming video. System 10 can include camera 12, configuration file 14, gateway/container 16, and publishing location/endpoint 18. Camera 12 can include streaming video data 20 having entire frame 22 with a first field of view. Scenes 24A, 24B, and 24C (i.e., individual regions of interest) can be selected/extracted from entire frame 22 each having a second field of view, a third field of view, and a fourth field of view, respectively, that are less than the first field of view of entire frame 22. Camera 12 collects streaming video data 20 and transfers/sends streaming video data 20 to gateway/container 16. Gateway/container 16 preprocesses streaming video data 20 according to preprocessing parameters defined in configuration file 14 and publishes (i.e., allows access/makes available) the preprocessed video data as first video data 21A (for scene 24A), second video data 21B (for scene 24B), and third video data 21C (for scene 24C) to publishing location/endpoint 18. Subscribers 26A-26D can subscribe to video data 21A-21A of each scene 24A-24C located at endpoint 18 to access each scene 24A-24C.

System 10 can include machine-readable storage media. In some examples, a machine-readable storage medium can include a non-transitory medium. The term "non-transitory" can indicate that the storage medium is not embodied in a carrier wave or a propagated signal. In certain examples, a non-transitory storage medium can store data that can, over time, change (e.g., in RAM or cache). In some examples, storage media can be entirely or in part a temporary memory, meaning that a primary purpose storage media is not long-term storage. Storage media, in some examples, is described as volatile memory, meaning that the memory, does not maintain stored contents when power to system 10 (or the component(s) where storage media are located) is turned off. Examples of volatile memories can include random access memories (RAM), dynamic random-access memories (DRAM), static random-access memories (SRAM), and other forms of volatile memories. In some examples, storage media can also include one or more machine-readable storage media. Storage media can be configured to store larger amounts of information than volatile memory. Storage media can further be configured for long-term storage of information. In some examples, storage media include non-volatile storage elements. Examples of such non-volatile storage elements can include magnetic hard discs, optical discs, flash memories and other forms of solid-state memory, or forms of electrically programmable memories (EPROM) or electrically erasable and programmable (EEPROM) memories. Most generally, storage media is machine-readable data storage capable of housing stored data from a stored data archive.

System 10 can also include one or multiple computer/data processors. In general, the computer/data processors can include any or more than one of a processor, a microprocessor, a controller, a digital signal processor (DSP), an application specific integrated circuit (ASIC), a field-programmable gate array (FPGA), or other equivalent discrete or integrated logic circuitry. System 10 can include other components not expressly disclosed herein but that are suitable for performing the functions of system 10 and associated methods of preprocessing and processing video data and other forms of data. For example, system 10 can include communication software and/or hardware for pushing/sending configuration file 14 from storage media at a location distant from gateway/container 16, such as cloud storage, to gateway/container 16 for execution/implementation on streaming video data 20.

Camera 12 can be any device capable of collecting streaming video data 20, such as a Real Time Streaming Protocol (RTSP) camera or a USB camera. Streaming video data 20 can be video data that is continuously captured/ recorded by camera 12 in any suitable format. Camera 12 can be positioned/located to provide streaming video data 20 displaying entire frame 22 with a first field of view. The first field of view shown/displayed by camera 12 can be a wide field of view that shows multiple regions of interest. Video data 20 being collected, for example, can show a wide field of view of a warehouse for storing commercial products and/or an assembly line producing commercial products of which each individual subscriber 26A-26D may only be interested in a region/scene 24A-24C that is a subset of entire frame 22. Camera 12 can collect and transfer streaming video data 20 in any resolution/video quality and any format, including (but not limited to) MP4, AVI, FLV, WMV, MOV, MPEG, Motion JPEG, AVCHD, WebM, and/or MKV. Camera 12 can transfer/send streaming video data 20 to gateway/container 16 over any suitable means, including via the internet, short-range wireless technology, or any other type of wired and/or wireless connection.

Configuration file 14 is an editable file that contains preprocessing parameters that define, among other instructions, how streaming video data 20 is to be preprocessed by gateway/container 16 to create video data 21A-21C. Configuration file 14 can include numerous other instructions for gateway/container 16, including which camera 12 to connect to (i.e., receive streaming video data 20 from), what portion of entire frame 22 to select/extract to create scenes 24A-24C (i.e., how to crop frame 22 to create scenes 24A-24C), and at which endpoint 18 to publish the preprocessed scenes 24A-24C. This is discussed in detail with regards to FIG. 2. Configuration file 14 can be edited/revised and pushed/ conveyed to gateway/container 16 for execution in real time (i.e., runtime) such that an editor can revise the preprocessing parameters and those revisions can be applied to scenes 24A-24C at runtime. Configuration file 14 can be an executable program file or have another format for including instructions and conveying information that is then used by gateway/container 16 to apply the preprocessing to video streaming data 20. Additionally, configuration file 14 can be stored in storage media adjacent to and/or part of gateway/ container 16 or in storage media distant from gateway/ container 16, such as in the cloud. Configuration file 14 can be accessible only by one editor or can be accessible by multiple parties (e.g., editors), which may include subscribers 26A-26D who can edit the preprocessing parameters defined by/within configuration file 14 to instruct gateway/ container 16 to preprocess one or each of scenes 24A-24C depending on the needs/desires of subscribers 26A-26D, respectively.

Gateway/container 16 can include a computer processor capable of performing instructions provided by configuration file 14, which can include preprocessing parameters that are to be applied to streaming video data 20. Gateway/ container 16 can be a gateway node, edge device, container, virtual machine, or other software and/or hardware able to accept configuration file 14 and perform the instructions therein to apply the preprocessing parameters to streaming video data 20. Further, gateway/container 16 can be within a single computer hardware set up due to virtualization. Gateway/container 16 can include one or multiple storage media for storing information, such as the preprocessing parameters pushed/sent to gateway/container 16 by/from configuration file 14 and/or other information like streaming video data 20. Gateway/container 16 can be located at various locations, including adjacent to camera 12 and/or on the same network as camera 12, distant from camera 12 with streaming video data 20 being received by gateway/container 16 from camera 12 via a wired or wireless connection, in the cloud, or at multiple locations. Gateway/container 16 is in communication with configuration file 14 to accept instructions for applying preprocessing parameters. Additionally, gateway/container 16 may be configured to contact configuration file 14 to determine if configuration file 14 has been edited. If edited, gateway/container 16 can perform preprocessing (on streaming video data 20 being received) according to the newly edited configuration file 14. In other examples, gateway/container 16 can utilize preprocessing parameters or other information included within configuration file 14 on a period basis, and can utilize changes (or edits) made to configuration file 14 when encountered in a next iteration of the period.

For clarity, streaming video data 20 is unaltered video data that is received by gateway/container 16 from camera 12, whereas first video data 21A is video data that has been preprocessed by gateway/container 16 (according to preprocessing parameters defined in configuration file 14) to create scene 24A. Similarly, second video data 21B is video data that has been preprocessed to create scene 24B, and third video data 21C is video data that has been preprocessed to create scene 24C. For each of first, second, and third video data 21A-21C, the originating video data is streaming video data 20 (which can be converted to raw video data 20A as described with regards to FIG. 3 below). Each of scenes 24A-24C can be a subset of entire frame 22 and show second, third, and fourth fields of view, respectively, that are less than the first field of view of entire frame 22. However, other scenes can have the same field of view as first field of view of entire frame 22 and instead, other editing is performed on that scene besides cropping; for example, that scene can be edited to be in grayscale whereas entire frame 22 of streaming video data 20 is in color.

Gateway/container 16 can be in communication with endpoint 18 to which gateway/container 16 publishes the preprocessed video data 21A-21C (e.g., scenes 24A-24C). The communication can be wired or wireless, such as communication via the internet. However, endpoint 18 can be at the same location as gateway/container 16 or on the same computer hardware set up and/or network. Further, endpoint 18 can be located on the internet with a unique address and/or security protocol that allows for subscription and access to scenes 24A, 24B, and 24C. Scenes 24A, 24B, and 24C can be published to endpoint 18 using an asynchronous messaging library, for example ZeroMQ, such that scenes 24A, 24B, and 24C are published as topic 1, topic 2, and topic 3, respectively. Subscribers 26A-26D can subscribe to any of topics 1-3 to receive video data 21A-21C of scenes 24A, 24B, 24C, respectively. Gateway/container 16 can publish video data 21A-21C of each of scenes 24A-24C to endpoint 18 in any format suitable for use by subscribers 26A-26D. For example, video data 21A-21C can each be published as Motion JPEG or any of the formats listed above with regards to streaming video data 20. The format that video data 21A-21C of each of scenes 24A-24C can be designated in configuration file 14 and applied to video data 21A-21C by gateway/container 16.

Each scene 24A-24C at topics 1-3, respectively, can be subscribed to by any number of subscribers 26A-26D. In the example shown in FIG. 1, scene 24A has two subscribers 26A and 26B, while scene 24B has one subscriber 26C, and scene 24C has one subscriber 26D. Video data 21A-21C of each of scenes 24A-24C can be further processed by subscriber 26A-26D, respectively, depending on the desired output/inference to be determined from video data 21A-21C. For example, first video data 21A of scene 24A can be further processed by an AI model to determine the amount of a particular product that has passed by camera 12 (in the second field of view of scene 24A) on an assembly line. This is described in detail with regards to FIG. 5.

FIG. 2 is a schematic of configuration file 14. Each "component" of configuration file 14 can be one or a set of instructions that, when executed by gateway/container 16, applies a process/edit. Thus, while this disclosure may discuss the components of configuration file 14 as being physical, tangible elements, the components can be one or multiple groups of executable software code contained within configuration file 14. Configuration file 14 includes information regarding camera credentials 28 and preprocessing parameters 30A-30C corresponding to scenes 24A-24C. Preprocessing parameters 30B and 30C can include the same type of information/parameters as preprocessing parameters 30A. However, for simplicity, the possibilities of information/parameters shown in FIG. 2 with regards to preprocessing parameters 30A are not shown for preprocessing parameters 30B and 30C. However, preprocessing parameters 30B and 30C can be the same or different from each other and from preprocessing parameters 30A corresponding to scene 24A. Preprocessing parameters 30A can include topic name/publishing location 32, video format 34, accompanying information 36, and preprocessing pipeline 38 having various video edits 38A-38O. Video edits 38A-38O can include the nonexclusive list of crop 38A, grayscale 38B, contrast 38C, brightness 38D, threshold 38E, resize 38F, blur 38G, hue saturation value (HSV) 38H, sharpen

381, erosion 38J, dilation 38K, Laplacian image processing 38L, Sobel image processing 38M, pyramid up 38N, and pyramid down 38O.

Configuration file 14 can be edited and pushed/conveyed to gateway/container 16 in real time (i.e., runtime) such that preprocessing parameters 30A-30C (and the other information contained in configuration file 14) can be applied to streaming video data 20 immediately to preprocess and output video data 21A-21C. Configuration file 14 can be stored, edited, and/or pushed/conveyed to gateway/container 16 in any suitable format/file type, such as a text file, a comma separated value file, or other format/file type. Configuration file 14 can include other information/parameters not expressly disclosed herein and not shown in FIG. 2.

Configuration file 14 can include camera credentials 28, which provides the information needed for gateway/container 16 to connect to camera 12 and/or receive streaming video data 20 from camera 12. Camera credentials 28 can include other information such as encryption/decryption information, security access information, and/or instructions for beginning and/or ending the collection of streaming video data 20 by camera 12. Camera credentials 28 can include information for connecting to multiple cameras 12 and/or information for gateway/container 16 to receive the same or different streaming video data 20 from the same or different cameras 12 for different scenes 24A-24C. In one example, camera credentials 28 are provided once and applied to all scenes 24A-24C. In another example, different camera credentials 28 are provided for each scene 24A-24C and applied to each of scenes 24A-24C individually.

Configuration file 14 also includes information specific to each scene 24A-24C. The information/instructions are designated as preprocessing parameters 30A, 30B, and 30C, respectively. Preprocessing parameters 30A-30C are used by gateway/container 16 (e.g., in the form of executable instructions or indications of the executable instructions) and applied to streaming video data 20 to create video data 21A-21C of scenes 24A-24C, respectively. Preprocessing parameters 30A-30C can include topic name/publishing location 32, which designates where video data 21A-21C of scenes 24A-24C will be published after preprocessing. As described below with regards to gateway/container 16 and FIG. 3, publishing location 32 can be a proxy location which is then relayed to unified endpoint 18 to make locating the topic/scenes 24A-24C easier for subscribers 26A-26D. Publishing location 32 can be any other location suitable for providing access to subscribers 26A-26D.

Configuration file 14 can designate video format 34 that each of scenes 24A-24C is to be published at, which can be the same format as streaming video data 20 or any other type of suitable video format, including the formats listed above with regards to streaming video data 20 and/or video data 21A-21C. Scenes 24A-24C can be published having the same video format 34 or different video formats 34. If the format of the video data of scenes 24A-24C is to be changed, the steps of changing the video format can be performed before, during, or after any of the other instructions/steps set out in preprocessing parameters 30A-30C. For example, video format 34 can be changed before, during, or after video edits 38A-38O are performed by gateway/container 16.

Preprocessing parameters 30A-30C can also include accompanying information 36, which is information provided/published with video data 21A-21C for each of scenes 24A-24C. Accompanying information 36 can include any information about first video data 21 that may be of use to subscribers 26A-26C. For example, accompanying information 36 can include first video data 21A frame size, which may be helpful in indicating to subscriber 26A what processing should be performed on first video data 21A of scene 24A; if the frame size is 720 pixels by 486 lines, first video data 21A of scene 24A may be most suitable for processing by an AI model. Accompanying information 36 can include metadata and/or other information regarding what preprocessing has been performed on streaming video data 20 to create video data 21A-21C for scenes 24A-24C, respectively.

Preprocessing parameters 30A-30C can also include preprocessing pipeline 38 that includes numerous video edits 38A-38O that can be applied to streaming video data 20 to create video data 21A-21C for each of scenes 24A-24C. Preprocessing pipeline 38 can designate the instructions for the entire video edits made to streaming video data 20 for each of scenes 24A-24C. The amount of time gateway/container 16 takes to perform the video edits designated by preprocessing pipeline 38 (i.e., video edits 38A-38O) for each of scenes 24A-24C can be measured, recorded, and displayed as preprocessing performance metrics (see FIG. 4). The order in which video edits 38A-38O are performed can be optimized (or otherwise enhanced for increasing accuracy, decreasing bandwidth or latency, etc.) by gateway/container 16 and/or optimized within configuration file 14 to reduce the amount of time gateway/container 16 takes to perform preprocessing pipeline 38. This optimization can be done manually by an editor (e.g., the individual with access to edit configuration file 14) or automatically by system 10. For example, depending on which video edits 38A-38O are to be performed in preprocessing pipeline 38 by gateway/container 16, the order of performance of those video edits 38A-38O can be rearranged to reduce the amount of time gateway/container 16 takes to perform preprocessing pipeline 38. In one example, crop 38A is the first video edit 38A-38O to be performed, followed by other video edits 38B-38O.

Video edits 38A-38O are a nonexclusive list of edits that can be designated in configuration file 14 and performed on streaming video data 20 by gateway/container 16. Preprocessing pipeline 38 can include other video edits not expressly included in the list of video edits 38A-38O. Similarly, not all of video edits 38A-38O need to be performed to create video data 21A-21C of each of scenes 24A-24C, and different scenes 24A-24C can include different video edits 38A-38O performed on streaming video data 20 by gateway/container 16. In one example, only crop 38A is performed on streaming video data 20 to create first video data 21A of scene 24A, while a different crop 38A and brightness 38D, resize 38E, and dilation 38K are performed on streaming video data 20 to create second video data 21B of scene 24B that is different than first video data 21A of scene 24A.

Each of video edits 38A-38O are briefly described as follows. Crop 38A is the removal of unnecessary areas/regions (i.e., regions that are not of-interest to the subscriber) of entire frame 22 having first field of view to create scenes 24A-24C each with second, third, and fourth field of views, respectively. Scenes 24A-24C that have been cropped 38A have fields of view that are a subset of (i.e., less than) first field of view of entire frame 22. Grayscale 38B is the alteration of the color of video data 21A-21C and can include limiting the color to be between white and black. Contrast 38C is the alteration of the difference between the maximum and minimum pixel intensity. Brightness 38D is the alteration in the luminous brightness of video data 21A-21C. Threshold 38E is the alteration of the color of video data 21A-21C by changing the color of select pixels of video data 21A-21C that are above a specified threshold color value. Resize 38F is the alteration of the frame size of video data 21A-21C without cutting/cropping any of the frame out. Blur 38G is the alteration of the clarity of video data 21A-21C, which may be desired for some processing applications, such as an AI model, performed by subscribers 26A-26D. Hue saturation value (HSV) 38H is assigning a numerical readout of video data 21A-21C that corresponds to the color contained therein. Sharpen 38I is altering video data 21A-21C to make the objects therein appear more defined/sharpened. Erosion 38J is altering video data 21A-21C by shrinking pixels and/or removing pixels on object boundaries, while dilution 38K is the reverse of erosion in that video data 21A-21C is enlarged by resizing pixels and/or adding pixels at object boundaries. Laplacian image processing 38L and Sobel image processing 38M are processing techniques known in the art that can be applied to video data 21A-21C. Pyramid up 38N and pyramid down 38O are altering video data 21A-21C by smoothing and/or subsampling as known in the art. Each of scenes 24A-24C can include these and other video edits 38A-38O to be applied by gateway/container 16 to preprocess streaming video data 20 and output as scenes 24A-24C for use by subscribers 26A-26D.

Configuration file 14 can arrange the instructions of camera credentials 28 and preprocessing parameters 30A-30C to be performed in any order, or gateway/container 16 can have the capabilities to arrange/rearrange the information/instructions to be performed in a desired/optimized sequence. Additionally, gateway/container 16 can be configured to perform each set of preprocessing parameters 30A-30C in parallel such that preprocessing parameters 30A, preprocessing parameters 30B, and preprocessing parameters 30C are performed at the same time (and the time gateway/container 16 takes to perform those preprocessing parameters are measured, recorded, and displayed as metrics). Configuration file 14 can be edited at any time by an editor and then pushed/conveyed/accessed by gateway/container 16 at runtime such that the preprocessing of video data 21A-21C is altered according to the newly edited configuration file 14 at runtime.

Figure 3:
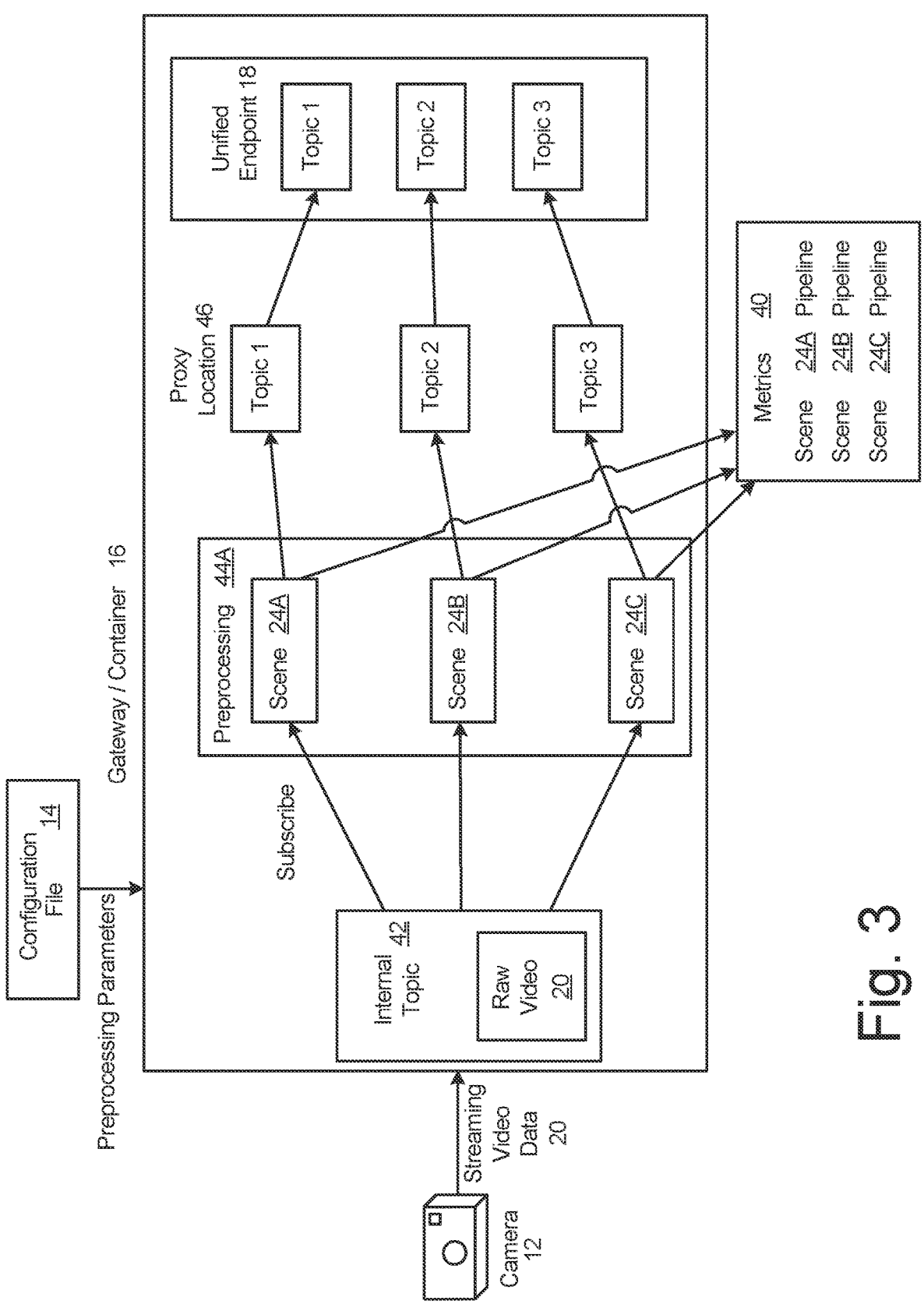
FIG. 3 is a schematic of a gateway/container along with the inputs and outputs of the gateway/container.

FIG. 3 is a schematic of gateway/container 16 (hereinafter, "gateway 16") along with inputs to and outputs from gateway 16. Each "component" of gateway 16 (and corresponding inputs and outputs) can be one or a set of instructions, programs, processors, storage media locations, and/or other software or hardware used to select/extract, preprocess, and publish video data 21A-21C as scenes 24A-24C. Thus, while this disclosure may discuss the components of gateway 16 (and corresponding inputs and output) as being physical, tangible elements, the components can be partially or entirely contained within software and/or hardware.

Inputs to gateway 16 can be streaming video data 20 (received from camera 12) and configuration file 14, which includes camera credentials 28 and preprocessing parameters 30A-30C. Outputs from gateway 16 can be scenes 24A-24C to unified endpoint 18, which is the location at which scenes 24A-24C are published as topics 1-3, and metrics 40, which is the location at which preprocessing pipeline 38 information (i.e., the amount of time gateway 16 takes to apply preprocessing parameters 30A-30C to streaming video data 20 to create scenes 24A-24C) is published/accessible. Gateway 16 can include raw video data 20A, which is streaming video data 20 that has been published at internal topic 42 and to which gateway 16 subscribes to receive video data used to create each of scenes 24A-24C. Gateway 16 can include preprocessing pipeline optimization and preprocessing 44, which uses preprocessing parameters 30A-30C as defined in configuration file 14 to preprocess streaming video data 20 (accessed as raw video data 20A at internal topic 42) to create scenes 24A-24C. Gateway 16 publishes scenes 24A-24C to proxy location 46 at topics 1-3, respectively. Gateway 16 can then publish/relay scenes 24A-24C (having video data 21A-21C) from proxy location 46 to unified endpoint 18.

Gateway 16 receives streaming video data 20 from camera 12 and can publish the video data as raw video data 20A at internal topic 42. This configuration provides for a constant, known location of published raw video data 20A independent of where the original streaming video data 20 is received from. Thus, if the location where streaming video data 20 is being received from changes (e.g., if one camera is disconnected but another camera comes online), raw video 20A will still be accessible at internal topic 42 without the need to change where gateway 16 is looking for video data to create scenes 24A-24C, thus ensuring a smooth transition of incoming streaming video data 20. Raw video data 20A published at internal topic 42 can be configured such that only gateway 16 has access.

Gateway 16 can be provided with the information in configuration file 14 (i.e., camera credentials 28 and preprocessing parameters 30A-30C) via a variety of avenues. In one example, gateway 16 has location information of configuration file 14 and actively accesses configuration file 14. In another example, configuration file 14 is pushed/conveyed to gateway 16 once, periodically, or continuously and gateway 16 passively waits to begin preprocessing streaming video data 20 until configuration file 14 has been received. Another example can be a combination of the two above examples in that gateway 16 actively accesses configuration file 14 at the beginning of preprocessing (and continues preprocessing following those known instructions) and configuration file 14 is pushed/conveyed to gateway 16 only after configuration file 14 has been edited/revised.

Gateway 16 can perform pipeline optimization on preprocessing parameters 30A-30C As discussed above, pipeline optimization can be performed by gateway 16 (or another component) to reduce the time gateway 16 takes to preprocess raw video data 20A to create video data 21A-21C (and attach any additional information) of scenes 24A-24C and/or to increase accuracy of the preprocessing operations. Pipeline optimization can include arranging/rearranging the order in which video edits 38A-380 are performed by gateway 16.

Gateway 16 can then, according to preprocessing parameters 30A-30C defined within configuration file 14, preprocess 44 raw video data 20A (which is derived from and similar to streaming video data 20) to edit raw video data 20A to create video data 21A-21C of scenes 24A-24C. The preprocessing to create each of scenes 24A-24C can be performed individually for each scene and can be performed in parallel (i.e., simultaneously). The preprocessing performed by gateway 16 can edit each of scenes 24A-24C to the desires/needs of subscribers 26A-26C, respectively. For example, gateway 16 can preprocess raw video data 20A to crop a first field of view of entire frame 22 to eliminate areas/regions of the first field of view that are of no interest to subscriber 26A and keep a second field of view of, for example, scene 24A that is a subset of the first field of view. Thus, further processing by subscriber 26A (or subscriber 26B) does not need to be performed on the areas (regions not of-interest) eliminated/trimmed by the cropping performed during preprocessing. In this example, the cropping reduces the processing time and resources needed by subscriber 26A. The alteration of video format can be included in the preprocessing and/or can be performed before, during, or after the application of other preprocessing parameters 30A-30C.

Scenes 24A-24C, which are made up of raw video data 20A that has been preprocessed according to configuration file 14 to create video data 21A-21C, are published/sent to proxy location 44. Because scenes 24A-24C are continuous video data, scenes 24A-24C are continuously published (e.g., made available) to subscribers 26A-26C, respectively. Scenes 24A-24C are published/sent first to proxy location 44 and then relayed to unified endpoint 18. Having scenes 24A-24C first being published/sent to proxy location 44 ensures that, no matter what path scenes 24A-24C take, video data 21A-21C of scenes 24A-24C will always end up at proxy location 44 and then be relayed to unified endpoint 18. Because scenes 24A-24C always end up at proxy location 44, unified endpoint 18 always knows the location to access scenes 24A-24C and can actively look to proxy location 44 to obtain scenes 24A-24C or passively wait for scenes 24A-24C to be published/sent to unified endpoint 18.

During preprocessing to create scenes 24A-24C, the amount of time gateway 16 takes to apply all of preprocessing parameters 30A-30C to raw video data 20A to create scenes 24A-24C, respectively, (or the amount of time gateway 16 takes to apply only video edits 38A-380 of preprocessing pipeline 38, depending on the desired measurement) is measured, recorded, and published at metrics 40 for viewing by an editor or any party with access. Metrics 40 can be published on an asynchronous messaging library like ZeroMQ (similar to the publishing of scenes 24A-24C) or can be displayed on a user interface similar to FIG. 4, which shows a display of scene preprocessing performance metrics 40A. Metrics 40 can be outputted from gateway 16 to numerous other systems and/or locations, including to the cloud or another location distant from gateway 16.

Figure 4:
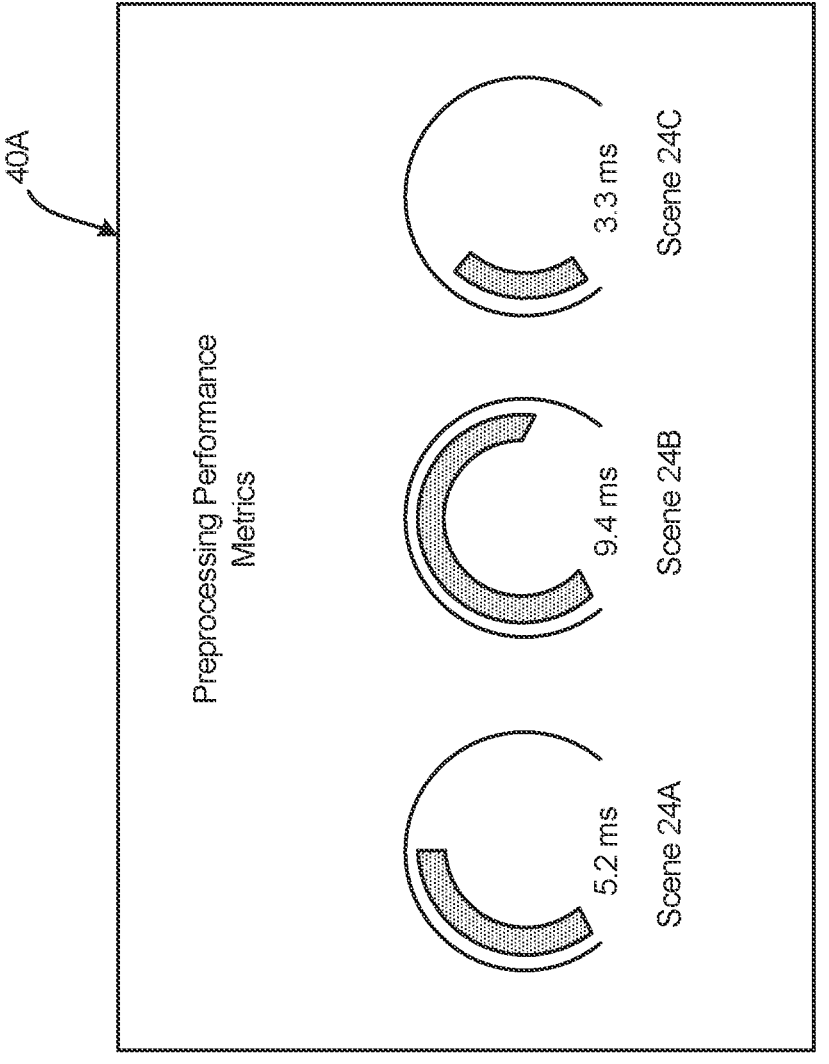
FIG. 4 is a display of the scene preprocessing performance metrics.

As shown in FIG. 4, scene preprocessing performance metrics 40A show a value of time for each of scenes 24A-24C. This value of time displayed is the amount of time gateway 16 takes to apply preprocessing parameters 30A-30C for each of scenes 24A-24C. Alternatively, this value of time displayed can be the amount of time gateway 16 takes to apply only video edits 38A-380 of preprocessing pipeline 38 and not the entirety of preprocessing parameters 30A-30C. This measurement may be desired because the other instructions/information of preprocessing parameters 30A-30C (other than video edits 38A-380) may not change between scenes 24A-24C while preprocessing pipeline 38 (the video edits 38A-380 being applied) may be drastically different from scene to scene and thus the amount of time for performing preprocessing pipeline 38 may vary greatly from scene to scene.

For example, preprocessing performance metrics 40A in FIG. 4 show an amount of time gateway 16 takes to perform the video edits of preprocessing pipeline 38 for scene 24A as 5.2 milliseconds (ms), for scene 24B as 9.4 ms, and for scene 24C as 3.3 ms. In this example, it may be desirable or necessary to alter preprocessing parameters 30B in configuration file 14 (either remove some edit and/or rearrange the order in which those edits are performed by gateway 16) to reduce the amount of time gateway 16 takes to apply preprocessing pipeline 38 to create/alter scene 24B. As discussed above, gateway 16 can have the capability to optimize the order in which the edits/instructions in preprocessing parameters 30A-30C and/or preprocessing pipelines 38 are performed to reduce the amount of time needed to preprocess/apply the edits/instructions. Thus, preprocessing performance metrics 40A as shown in FIG. 4 may be the shortest amount of time gateway 16 takes to perform preprocessing parameters 30A-30C (or preprocessing pipeline 38, depending on the chosen measuring points).

Scenes 24A-24C can be published from proxy location 44 to unified endpoint 18 as topics 1-3 within an asynchronous messaging library, such as ZeroMQ. Unified endpoint 18 allows for a known, constant location to which subscribers 26A-26C can look to access scenes 24A-24C, respectively. If more scenes are created, those scenes would be published and accessible at unified endpoint 18, so subscribers 26A-26D and/or other subscribers would know where to look to access the additional scenes.

Figure 5:
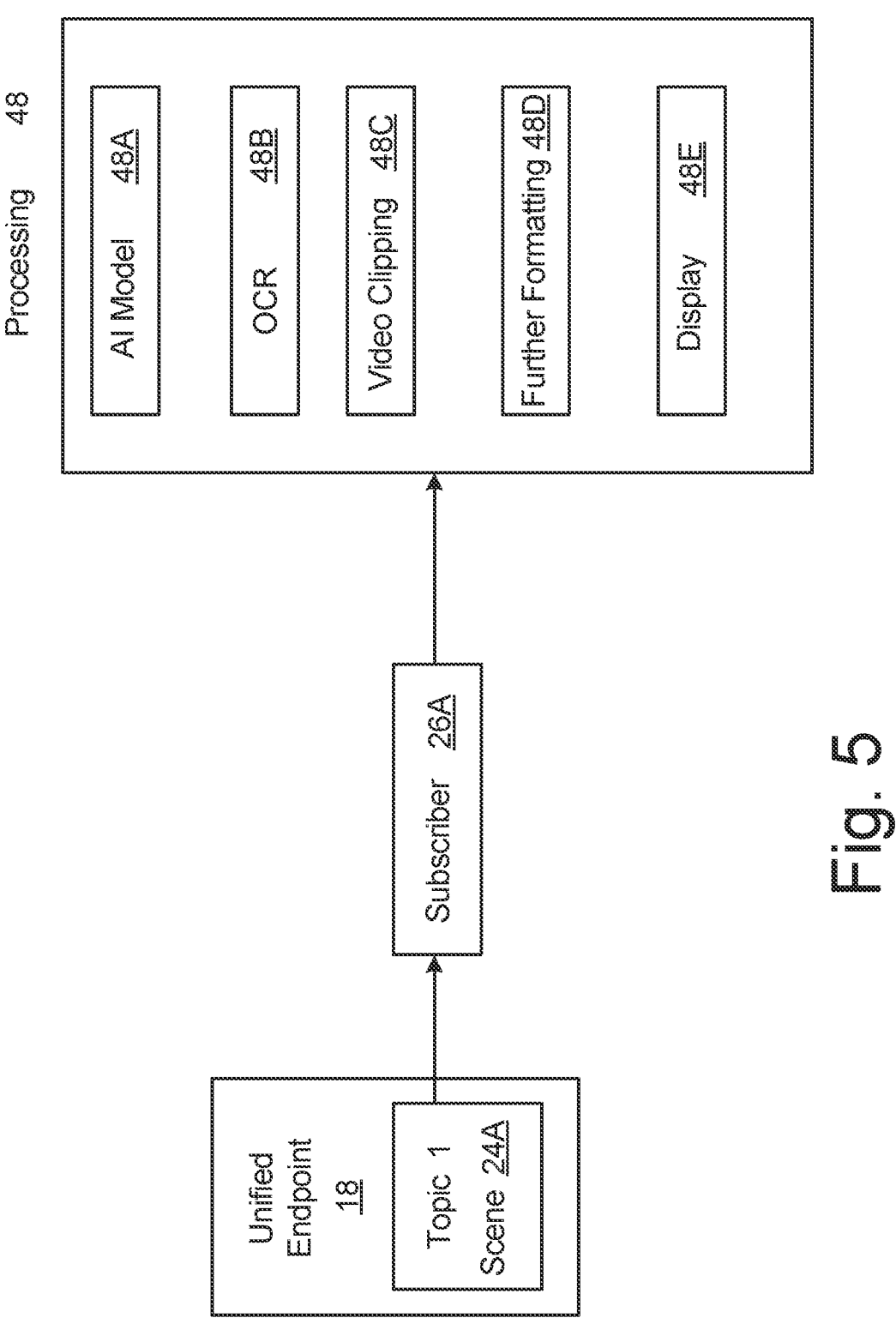
FIG. 5 is a schematic of potential processing by a first subscriber.

FIG. 5 is a schematic showing processing 48 capable of being performed on scene 24A by first subscriber 26A. Processing 48 can also be performed on scenes 24B and 24C or other scenes not disclosed herein.

After being published/sent to endpoint 18, scenes 24A-24C are available to be subscribed to and accessed by subscribers 26A-26D. Each scene can be subscribed to by any number of subscribers as is necessary/desirable. For example, a scene may be subscribed to by numerous subscribers each running processing 48 that includes different AI models. In this example, one AI model can be determining the amount of a first product that is passing through the scene on an assembly line, while a second AI model can be determining the amount of a second product that is passing through the scene on the same assembly line. In this case, the scene is unchanged between the two AI models (i.e., between the two subscribers) but the processing performed by each subscriber after the scene has been published is different. It should be noted that one entity (e.g., a person, company, quality control sector) can subscribe to a scene multiple times and thus constitute multiple subscribers. As discussed above, the preprocessing performed to create/alter each scene can be tailored to the needs of the subscriber(s) to, for example, reduce processing 48 resources and time needed to determine at least one output that is indicative of an inference the subscriber is aiming to ascertain.

The example in FIG. 5 shows first subscriber 26A performing processing 48 on scene 24A. Processing 48, as selected and executed by subscriber 26A (either automatically and/or manually by a computer processor and/or other hardware and software), can include AI model 48A, optical character recognition (OCR) 48B, video clipping 48C, further formatting 48D, and display 48E of the video data of scene 24A. Processing 48 can include other instructions/edits not expressly disclosed in FIG. 5 and listed above.

The disclosed potential instructions/edits that subscriber 26A can perform in processing 48 are as follows. AI model 48A can be a program/model that may have machine learning and can use scene 24A to determine at least one output indicative of an inference dependent upon scene 24A. The inference, for example, can be the amount of a specific product that is viewable in scene 24A over a defined period of time. AI model 48A can also be, for example, a program/model that determines how many people appear in scene 24A over a defined period of time. AI model 48A can include other capabilities and/or configurations. OCR 48B can be a program (or other configuration) that recognizes and records any characters (i.e., text) that appear in scene 24A. For example, scene 24A can be video data of a street and OCR 48B will recognize and record any text that appears on the side of a vehicle, such as a delivery truck, that is in scene 24A. Video clipping 48C can clip the video data shown in scene 24A to create a clip of a defined period of time, and/or video clipping 48C can clip the video data shown in scene 24A to create a static image of a defined moment in time. Further formatting 48D can be video edits, such as video edits 38A-380 in configuration file 14, or any other video or file formatting that are performed by subscriber 26A. For example, further formatting 48D can include cropping scene 24A to be a subset of the second field of view shown in scene 24A. Display 48E can be making scene 24A viewable on a screen or other visual display. Display 48E can also include any video formatting/reconfiguring that is necessary to effectuate the display of scene 24A. While video edits 38A-380 and further formatting 48D to create and/or process video data 21A-21C have included only edits to the video/image, edits can include editing the audio or other aspects of the video data.

The potential instructions/edits (i.e., processing 48) can be performed in parallel or series. Further, processing 48 can be configured such that instructions/edits 48A-48E work together such that one instruction/edit is prompted by an inference from another instruction/edit. For example, video clipping 48C can be configured to work in tandem with another edit/process; if AI model 48A determines that a product is defective, video clipping 48C can be prompted to record and clip a particular duration (or moment to create a static image) of scene 24A showing the defective product and save the clip (or image) for proof/validation.

System 10, with associated methods, for selection/extraction, preprocessing, and publishing of streaming video data 20 into scenes 24A-24C and for processing scenes 24A-24C is used to determine at least one output that is indicative of an inference dependent upon video data 21A-21C. System 10 reduces the preprocessing/processing time and resources necessary for accomplishing the desired output/determining the selected inference. System 10 allows for a streamlined process that extends from collecting streaming video data 20 from camera 12 to making preprocessing scenes 24A-24C available to subscribers 26A-26C for further processing and analysis/determinations. System 10 also allows for measurement, recordation, and viewing of preprocessing performance metrics 40 and optimization of preprocessing pipeline 38 (and/or preprocessing parameters 30A-30C) to reduce the amount of time and resources needed to apply preprocessing parameters 30A-30C to streaming video data 20 (i.e., raw video data 20A) to create video data 21A-21C of scenes 24A-24C.

Figure 6:
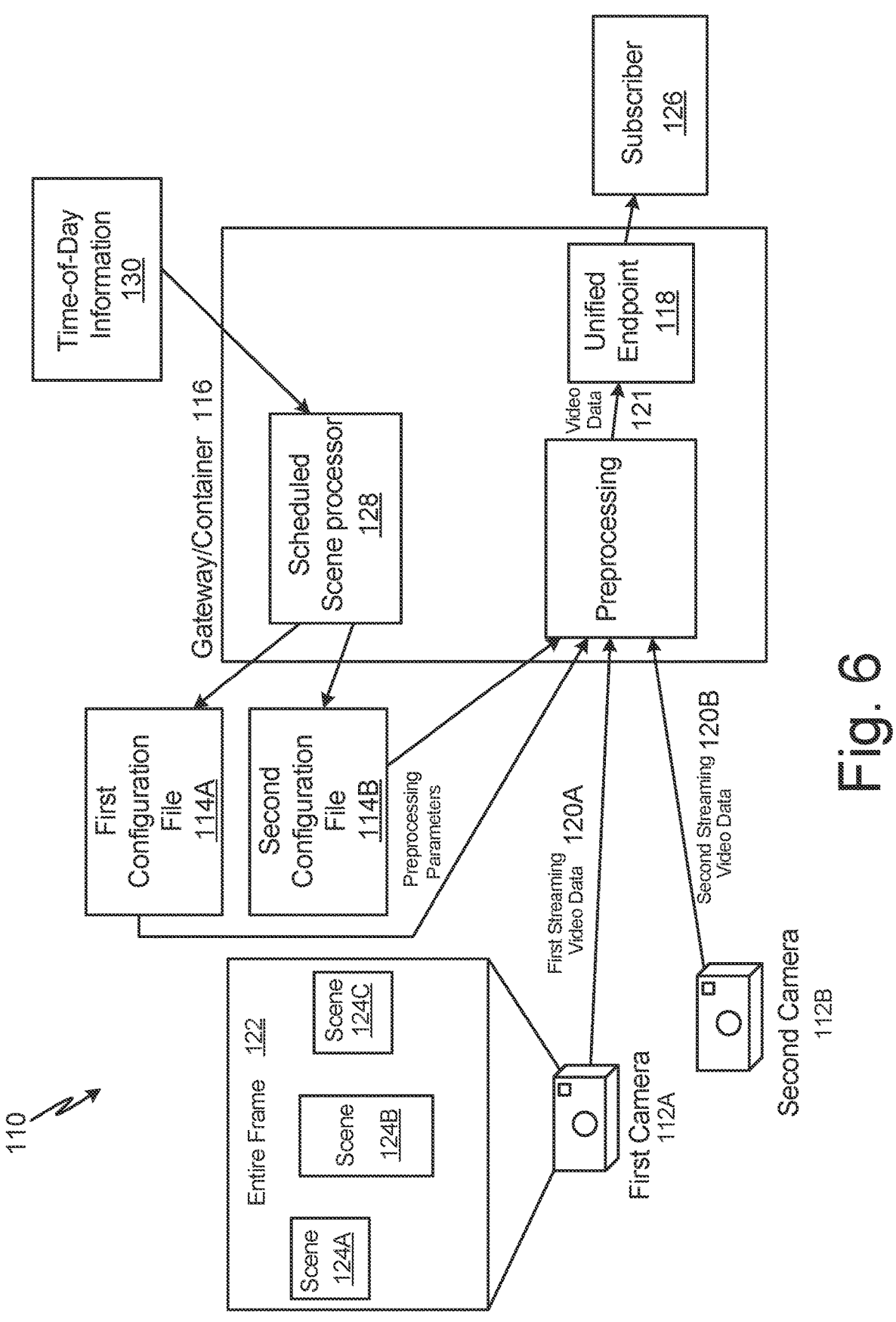
FIG. 6 is a schematic of scheduled scene modification and preprocessing system.

FIG. 6 is a schematic of scheduled scene modification and preprocessing system 110. System 110 includes first camera 112A and second camera 112B. First camera 112A collects first streaming video data 120A, and second camera 112B collects second streaming video data 120B. For exemplary purposes, first camera 112A collects first streaming video data 120A that is shown having entire frame 122 that includes scenes 124A, 124B, and 124C. System 110 can also include first configuration file 114A and second configuration file 114B used by gateway/container 116 for preprocessing streaming video data 120A and 120B to create video data 121. Gateway/container 116 (referred hereinafter as gateway 116) can include scheduled scene processor 128 (that can accept and/or use time-of-day information 130) and unified endpoint 118. Unified endpoint 118 can also be distant from and/or a separate component from gateway 116. Video data 121 can be published at unified endpoint 118 for access by subscriber 126.

In a first configuration, video data 121 is dependent upon first streaming video data 120A. In one example, video data 121 is formed from scene 124A (i.e., a first region of interest) and has a second field of view that is less than the first field of view comprising entire frame 122 shown by first camera 112A (as first streaming video data 120A). Other configurations can include video data 121 being formed from scene 124B or scene 124C, or video data 121 can be dependent upon second streaming video 120B as collected by second camera 112B. Second streaming video data 120B can have a different entire frame 122 with difference scenes 124A-124C. In this configuration, video data 121 is dependent upon streaming video data 120B in a similar manner to the configuration with streaming video data 120A and scene 124A. As described below, scheduled scene processor 128 of gateway 116 can change the camera/streaming video source from first camera 112A to second camera 112B (and vice-versa), so the video data received by gateway 116 can change from first streaming video data 120A to second streaming video data 120B (and vice-versa).

System 110 can have all the components and capabilities of system 10, and can include additional components and capabilities described herein. For example, system 110 can include machine-readable storage medium and/or one or multiple computer/data processors. Additionally, components of similar name and/or reference number of system 10 and system 110 (while adding a 1 to the front of reference numbers of system 110) can have similar configurations and/or capabilities. For example, camera 12 of system 10 can be similar in configuration and capabilities to first camera 112A and second camera 112B of system 110. Similarly, configuration file 14 of system 10 can be similar in configuration, capabilities, etc. as first configuration file 114A and second configuration file 114B of system 110.

First camera 112A and second camera 112B have the same configurations and capabilities as camera 12 of system 10. First camera 112A collects first streaming video data 120A that includes entire frame 122 with first streaming video data 120A able to be preprocessed to create video data 121 that can include one of example scenes 124A-124C having a field of view that is smaller (i.e., less than) a field of view of entire frame 122. Similarly, second camera 112B collects first streaming video data 120B that can include an entire frame and/or other image data that is able to prepro-cessed to create video data 121. However, the placement, orientation, field of view, etc. of first camera 112A can be different than that of second camera 112B. For example, first camera 112A can overlook a manufacturing assembly line and be oriented as to point/look North, while second camera 112B can overlook the same manufacturing assembly line but be oriented to point/look East. First streaming video data 120A and/or second streaming video data 120B can be transmitted to gateway 116 or, in another configuration, can be published to an internal endpoint to which gateway 116 subscribes to access streaming video data 120A and/or 120B. Additionally, when not in use, first camera 112A and/or second camera 112B can stop collecting and/or transmitting streaming video data 120A and/or 120B, respectively. While shown as having two cameras, system 110 can have any number of cameras collecting and trans-mitting streaming video data.

First configuration file 114A and second configuration files 114B can have the same capabilities as configuration file 14 of system 10. Configuration files 114A and 114B are each an editable file that contains preprocessing parameters that define, among other instructions, how streaming video data 120A or 120B is to be preprocessed by gateway 116 to create video data 121. System 110 has the capability to include multiple configuration files 114A and 114B each having different preprocessing parameters and/or each des-ignating camera 112A or 112B for a source of streaming video data 120A or 120B, respectively. Gateway 116 can receive/access one or all of configuration files 114A and 114B and, when instructed by scheduled scene processor 128, perform the instructions within each configuration file to preprocess streaming video 120A or 120B (and/or select the camera source).

Configuration files 114A and/or 114B can be edited/revised and pushed/conveyed to gateway 116 for execution in real time (i.e., runtime), and/or configuration files 114A and/or 114B can be stored for later use by gateway 116 depending on a time schedule. Thus, configuration files 114A and/or 114B can include preprocessing parameters aimed at preprocessing streaming video data 120A or 120B to create video data 121 that is more suitable for processing by subscriber 126 than if a previous configuration file was applied to the streaming video data. For example, first configuration file 114A can include preprocessing param-eters that format/edit first streaming video data 120A during specified nighttime hours to create video data 121 that is bright enough for processing by subscriber 126, and second configuration file 114B can include preprocessing param-eters that format/edit first streaming video data 120A during specified daytime hours to create video data 121 that is not too bright to allow for processing by subscriber 126. In another example, first configuration file 114A includes cam-era credentials that designate first camera 112A as the camera source during specified nighttime hours, and second configuration file 114B includes camera credentials that designate second camera 112B as the camera source during specified daytime hours. System 110 can include any num-ber of configuration files designated to be used by gateway 116 at any moment/duration.

Additionally, system 110 can include only one configu-ration file 114 and have the capability to alter the one configuration file 114 dependent upon scheduled scene pro-cessor 128 and time-of-day information 130. Thus, instead of having multiple configuration files 114A and 114B with different preprocessing parameters, system 110 can have only one configuration file 114 with preprocessing param-eters that change dependent upon a time schedule.

Gateway 116 can have the same configurations and capa-bilities as gateway 16 of system 10. Gateway 116 can include a computer processor capable of performing instruc-tions provided by any of configuration files 114A and 114B, which each can include preprocessing parameters that are able to be applied by gateway 116 to streaming video data 120A and/or 120B. Gateway 116 can include one or multiple storage media for storing information, including temporary or permanent storage of one or all of configuration files 114A and 114B, time-of-day information 130, streaming video data 120A and 120B, video data 121, information related to the performance of unified endpoint 118 and/or scheduled scene processor 128, or any other information of system 110. Gateway 116 is in communication with one or all configuration files 114A and 114B to accept instructions for applying preprocessing parameters to the designed streaming video data 120A or 120B. Additionally, gateway 116 can be configured to contact the designated configura-tion file 114A and 114B (as designated by scheduled scene processor 128) to retrieve the preprocessing parameters to be applied to the designated source streaming video data 120A or 120B. For additional configurations and capabilities of gateway 116, refer to the disclosure with regards to FIGS. 1 and 3 above.

Scheduled scene processor 128 can be a component within gateway 116, or scheduled scene processor 128 can be a stand-a-lone component separate from gateway 116.

Scheduled scene processor 128 can include a computer processor (and/or can share a computer processor with gateway 116) and can be configured to include, receive, or otherwise access time-of-day information 130. Scheduled scene processor 128 can also include one or multiple storage media for storing any necessary information. Scheduled scene processor 128 can include instructions (i.e., a time schedule) for determining when and for which duration each configuration file 114A and 114B should be implemented by gateway 116 to preprocess streaming video data 120A or 120B. For example, scheduled scene processor 128 can include a time schedule that designates first configuration file 114A is to be implemented/applied from 12 AM to 6:59 AM each day, second configuration file 114B is to be implemented/applied from 7 AM to 5:59 PM each day, and first configuration file 114A is to be implemented/applied from 6 PM to 11:59 PM each day. Scheduled scene processor 128 can include a user interface or other capabilities for allowing a user to modify the time schedule in real time and implement the modified time schedule at runtime. Scheduled scene processor 128 can also allow for remote access of the time schedule to allow for modification of the time schedule by a user distant from system 110.

Scheduled scene processor 128 is in communication with time-of-day information 130, which can be a separate component or can be within schedule scene processor 128 (and/or gateway 116). Time-of-day information 130 can be a software program or another component for tracking time (and potentially date) information and relaying that information to scheduled scene processor 128 so that scheduled scene processor 128 can trigger any changes specified in the time schedule. For example, time-of-day information 130 can be a clock maintained by gateway 116. Additionally, scheduled scene processor 128 can actively monitor time-of-day information 130 (as opposed to passively waiting for time-of-day information 130 to be relayed to scheduled scene processor 128).

Once streaming video data 120A and/or 120B has been preprocessed by gateway 116 according to preprocessing parameters in one of configuration files 114A or 114B (depending on the time schedule in scheduled scene processor 128), the preprocessed video data 121 is published to unified endpoint 118. Unified endpoint 118 is the same in configuration and capabilities as unified endpoint 18 described above. Unified endpoint 118 can be contained within gateway 116 or can be a separate location/component adjacent to or distant from gateway 116. Once published to unified endpoint 118, video data 121 can be accessed by subscriber 126 for viewing, editing, and/or any desired analysis and/or modification. Subscriber 126 can have the same configurations and/or capabilities as any subscribers 26A-26D previously described above. In one example, subscriber 126 is an artificial intelligence (AI) model that analyzes/processes video data 121 for an output indicative of an inference dependent upon video data 21. The preprocessing as designated by first configuration file 114A or second configuration file 114B (dependent upon the time schedule) can be aimed at making the analysis/processing performed by the AI model of subscriber 126 more accurate. For example, accuracy of the AI model of subscriber 126 can be increased by the AI model determining a greater number of inferences and/or a greater probability that the determination of the inference is correct.

Gateway 116 receives streaming video data 120A or 120B from first camera 112A or 112B, respectively (as designated in one of configuration files 114A or 114B). Gateway 116 can then preprocess streaming video data 120A or 120B according to preprocessing parameters defined within first configuration file 114A to format/edit streaming video data 120A or 120B to create first video data 121. First video data 121 can be of a first region of interest with a field of view that is less than the field of view of entire frame 122 (such as scenes 124A, 124B, or 124C). First video data 121 is then published to unified endpoint 118 to allow access and processing by subscriber 126. Then, in response to the time schedule of scheduled scene processor 128 and time-of-day information 130, gateway 116 preprocesses streaming video data 120A or 120B according to preprocessing parameters defined within second configuration file 114B to format/edit streaming video data 120A or 120B to create second video data 121 that is different than first video data 121 that was created according to preprocessing parameters defined within first configuration file 114A. Second video data 121 is then published to unified endpoint 118 to allow access and processing by subscriber 126.

The time schedule of scheduled scene processor 128 defines when gateway 116 executes/applies first configuration file 114A or second configuration files 114B. Each configuration file can include a plurality of video edits as described with regards to FIG. 2 above and can set out the order in which the plurality of video edits are performed by gateway 116. Thus, the order in which the plurality of video edits are executed/performed is dependent upon the time schedule because the time schedule designated when each configuration file is used/applied by gateway 116. For example, configuration files 114A and 114B can have the exact same video edits, but one configuration file can designate that the video edits are to be performed in a different order. Thus, when scheduled scene processor 128, according to the time schedule, switches system 110 from applying first configuration file 114A to applying second configuration file 114B, the order in which the video edits are executed is dependent upon the time schedule. Additionally, in the same manner, the number of video edits of first configuration file 114A can be different than the number of video edits of second configuration file 114B.

Moreover, the intensity value of each video edit of first configuration file 114A can be different than the intensity value of that same video edit of second configuration file 114B. For example, first configuration file 114A can include an intensity value of ten for the brightness video edit while second configuration file 114B can include an intensity value of eighty for the brightness video edit. Thus, when scheduled scene processor 128, according to the time schedule, switches system 110 from applying first configuration file 114A to applying second configuration file 114B, the intensity value of the brightness video edit is dependent upon the time schedule. Configuration files 114A and/or 114B can have an intensity value of one of the video edits that changes dependent upon a function of time as set out in the time schedule. For example, an intensity value of the brightness video edit can depend on a function of time as set out in the time schedule. This can be implemented by having one configuration file having capabilities to change the video edit depending on the time, or it can be implemented by having multiple configuration files with an intensity value of that particular video edit that is definite but different in each configuration file and changes from one configuration file to the next as a function of time. In the latter configuration, the scheduled scene processor 128 would then implement/apply the configuration files in an order and based on a schedule so that the intensity value of the one video edit changes as a function of time.

Scheduled scene processor 128 that includes the time schedule for determining when to implement and the duration of implementation of each configuration file does not need to be based on time-of-day information 130 and can determine when and for how long to implement each configuration file based on a variety of factors, such as the average brightness of entire frame 122. In this example, if the average brightness of entire frame 122 is less than a specific value, scheduled scene processor 128 can switch the currently implemented configuration file to another configuration file better suited to handle low-light streaming video data and potentially apply video edits to increase the brightness of the video data. Alternatively, if the average brightness of entire frame 122 is greater than a specific value, scheduled scene processor 128 can switch the currently implemented configuration file to another configuration file better suited to handle high-light streaming video data and potentially apply video edits to decrease the brightness of the video data. Scheduled scene processor 128, and system 110, can have other configurations and capabilities not expressly disclosed herein.

Additionally, configuration files 114A and 114B can have video edits that change the scene of streaming video data 120A and 120B. For example, the crop video edit in first configuration file 114A can crop entire frame 122 of first streaming video data 120A such that first video data 121 only includes scene 124A, while the crop video edit in second configuration file 114B can crop entire frame 122 of first streaming video data 120A such that first video data 121 only includes scene 124B. Thus, when gateway 116 switches from applying first configuration file 114A to applying second configuration files 114B, video data 121 will switch from including scene 124A to including scene 124B. As described above, configuration files 114A and 144B can have different camera credentials that change the source of streaming video data such that, for example, when gateway 116 switches from applying first configuration file 114A to applying second configuration file 114B, first streaming video data 120A is no longer preprocessed and instead second streaming video data 120B is now received from second camera 112B and preprocessed by gateway 116. In this situation, video data 121 would then be based upon second streaming video data 120B from second camera 112B as determined in the now applied second configuration file 114B. System 110 can be configured such that gateway 116 continuously receives both first streaming video data 120A and second streaming video data 120B but only one streaming video data 120A or 120B is preprocessed by gateway 116 depending on the particular configuration file being applied at that particular moment (based on the time schedule of scheduled scene processor 128). System 110 can include other components and capabilities not expressly disclosed herein.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A method of scheduled modifications of preprocessing of incoming video data of at least one region of interest from a camera collecting video data having a first field of view, the method comprising:

receiving incoming video data from the camera;

preprocessing the incoming video data, by a computer processor, according to preprocessing parameters defined within a runtime configuration file, wherein the preprocessing includes formatting the incoming video data to create first video data of a first region of interest with a second field of view that is less than the first field of view;

publishing the first video data of the first region of interest to an endpoint to allow access and processing by a subscriber;

in response to a time schedule, altering the preprocessing parameters defined within the runtime configuration file dependent upon the time schedule to create second video data that is different from the first video data; and publishing the second video data to the endpoint to allow access and processing by the first subscriber, wherein the preprocessing parameters include first preprocessing parameters that include a plurality of first video edits defined within a first runtime configuration file used to preprocess the incoming video data to create the first video data and second preprocessing parameters that include a plurality of second video edits defined within a second runtime configuration file dependent upon the time schedule, the second preprocessing parameters used to preprocess the incoming video data to create the second video data, wherein an order of execution of the plurality of second video edits is set out in the time schedule to reduce an amount of time taken by the first subscriber to process the second video data.

2. The method of claim 1, wherein an order of execution of the plurality of second video edits is different that an order of execution of the plurality of first video edits.

3. The method of claim 1, wherein the plurality of first video edits and the plurality of second video edits each include at least one of the following video edits: crop, grayscale, contrast, brightness, color threshold, resize, blur, hue saturation value, sharpen, erosion, dilation, Laplacian image processing, Sobel image processing, pyramid up, and pyramid down.

4. The method of claim 3, wherein the number of video edits of the plurality of second video edits is different than the number of video edits of the plurality of first video edits.

5. The method of claim 1, wherein one video edit of the plurality of second video edits has an intensity value that changes dependent upon the time schedule.

6. The method of claim 5, wherein the change of intensity value of the one video edit is dependent upon a function of time set out in the time schedule.

7. The method of claim 1, further comprising:

processing, by the subscriber that includes a second computer processor, the first video data to determine a first output that is indicative of a first inference dependent upon the first video data; and processing, by the subscriber that includes the second computer processor, the second video data to determine a second output that is indicative of a second inference dependent upon the second video data.

8. The method of claim 1, wherein the time schedule is dependent upon a time of day.

9. A method of scheduled modification of a source of incoming video data, the method comprising:

receiving first incoming video data from a first camera;

preprocessing the first incoming video data, by a computer processor, according to first preprocessing parameters that include a plurality of first video edits defined within a first runtime configuration file, wherein the preprocessing includes formatting the first incoming video data to create first video data of a first region of interest;

publishing the first video data of the first region of interest to an endpoint to allow access by a subscriber;

in response to a time schedule, changing the source of incoming video data from the first incoming video data to second incoming video data that is received from a second camera;

preprocessing the second incoming video data according to second preprocessing parameters that include a plurality of second video edits defined within a second runtime configuration file to create second video data that is different from the first video data; and publishing the second video data to the endpoint to allow access and processing by the subscriber, wherein an order of execution of the second video edits is defined within the time schedule to decrease a latency between the preprocessing of the second incoming video data to create the second video data and the publishing of the second video data to the endpoint.

10. The method of claim 9, wherein the time schedule that triggers the change in the source of incoming video data is dependent upon a time of day.

11. A system for scheduled modification of preprocessing of incoming video data for use by a subscriber, the system comprising:

a first camera configured to collect first incoming video data that has a frame with a first field of view;

a first runtime configuration file that includes first preprocessing parameters having a plurality of first video edits for formatting the first incoming video data;

a gateway that includes a computer processor, the gateway being configured to receive the first incoming video data from the first camera and preprocess the first incoming video data according to the first preprocessing parameters defined within the first runtime configuration file, wherein the preprocessing of the first incoming video data by the gateway creates first video data of a first region of interest;

an endpoint to which the first video data of the first region of interest is published to allow access and processing by the subscriber; and a second runtime configuration file that includes second preprocessing parameters having a plurality of second video edits for formatting the first incoming video data, wherein, in response to a time schedule, the gateway ceases preprocessing the first incoming video data according to the first preprocessing parameters defined in the first runtime configuration file and begins preprocesses the first incoming video according to the second preprocessing parameters defined in the second runtime configuration file to create second video data, wherein the second video data is published to the endpoint to allow access and processing by the subscriber, wherein an order of execution of the second video edits is set out in the second preprocessing parameters to reduce a bandwidth of the second video data as published to the endpoint.

12. The system of claim 11, wherein an order of execution of the plurality of second video edits is dependent upon the time schedule.

13. The system of claim 11, wherein the plurality of first video edits and the plurality of second video edits each include at least one of the following video edits: crop, grayscale, contrast, brightness, color threshold, resize, blur, hue saturation value, sharpen, erosion, dilation, Laplacian image processing, Sobel image processing, pyramid up, and pyramid down.

14. The system of claim 13, wherein the number of video edits of the plurality of second video edits is different than the number of video edits of the plurality of first video edits.

15. The system of claim 11, wherein one video edit of the plurality of second video edits has an intensity value of a brightness video edit that changes dependent upon a function of time set out in the time schedule.

* * * * *